United States Patent

Hussey et al.

[11] Patent Number: 6,130,622
[45] Date of Patent: Oct. 10, 2000

[54] SYSTEM AND METHOD FOR REMOTE CONVENIENCE FUNCTION CONTROL HAVING A REKEY SECURITY FEATURE

[75] Inventors: James W. Hussey, Canton; Joan F. Rayford, Livonia, both of Mich.

[73] Assignee: TRW Inc., Lyndhurst, Ohio

[21] Appl. No.: 09/132,132

[22] Filed: Aug. 10, 1998

[51] Int. Cl.[7] .................................................. G06F 7/04
[52] U.S. Cl. .................. 340/825.31; 340/542; 70/257; 235/382; 348/734
[58] Field of Search .................. 340/825.31, 825.69, 340/825.72, 825.34, 825.56, 542; 70/257, 278; 235/382; 348/734; 359/142; 80/13 D

[56] References Cited

U.S. PATENT DOCUMENTS

| | | |
|---|---|---|
| 4,509,093 | 4/1985 | Stellberger .............................. 361/172 |
| 4,686,529 | 8/1987 | Kleefeldt . |
| 4,688,036 | 8/1987 | Hirano et al. . |
| 4,847,614 | 7/1989 | Keller . |
| 5,164,986 | 11/1992 | Bright . |
| 5,301,232 | 4/1994 | Mulford . |
| 5,319,711 | 6/1994 | Servi . |
| 5,369,706 | 11/1994 | Latka . |
| 5,563,600 | 10/1996 | Miyake . |
| 5,600,324 | 2/1997 | Reed et al. . |
| 5,613,214 | 3/1997 | Shirasawa et al. . |
| 5,680,131 | 10/1997 | Utz . |

*Primary Examiner*—Michael Horabik
*Assistant Examiner*—Anthony A. Asongwed
*Attorney, Agent, or Firm*—Tarolli, Sundheim, Covell, Tummino & Szabo L.L.P.

[57] ABSTRACT

A remote convenience system (10) for remote control performance of a function includes a portable transceiver (14) and a controller transceiver (16). Preferably, the system (10) is for a vehicle (12), and the controller transceiver (16) is vehicle-based. The portable transceiver (14) is operable for remote control requests, and includes circuitry (42, 52, 54, and 60) for transmitting a function request signal (18) that contains a function request (C) and a security key ($T_1$). Also, circuitry (42, 52, 54, and 60) of the portable transceiver (14) receives a response signal (36) that contains a new security key ($T_2$), and updates to the new security key. The vehicle-based transceiver (16) includes circuitry (30, 74, 78, and 82) for processing valid function requests and for controlling performance of the requested function. The circuitry (30, 74, 78, and 82) of the vehicle-based transceiver (16) receives the function request signal (18), and transmits the response signal (36), with the new security key, to the portable transceiver (14) in response to receiving the function request signal.

16 Claims, 4 Drawing Sheets

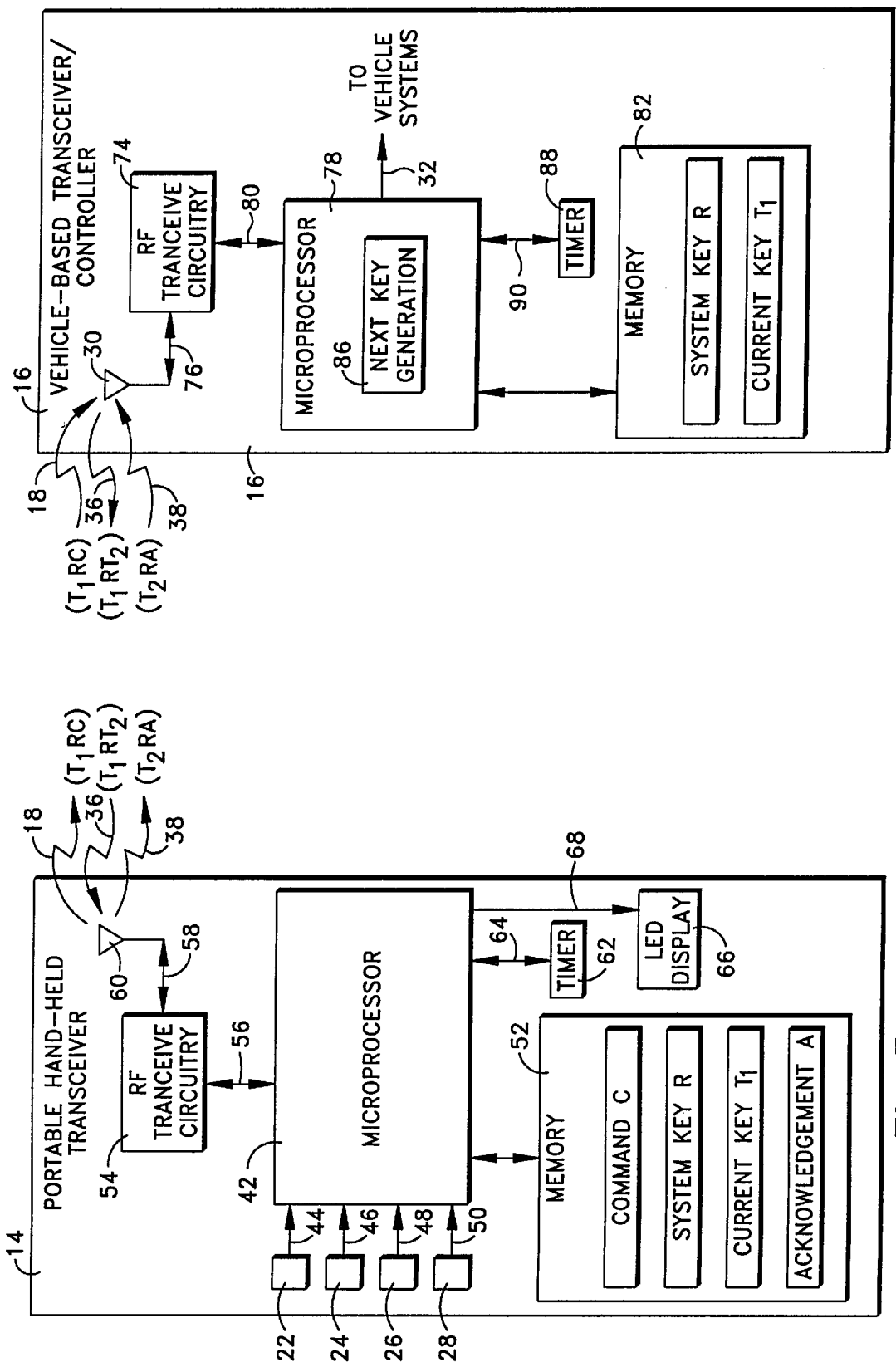

SYSTEM AND METHOD FOR REMOTE CONVENIENCE FUNCTION CONTROL HAVING A REKEY SECURITY FEATURE

FIELD OF THE INVENTION

The present invention relates to remote convenience systems, and is particularly directed to systems in which a security code accompanies a transmitted remote convenience function request.

BACKGROUND OF THE INVENTION

Remote convenience systems are known in the art. Such remote convenience systems permit remote control of certain functions. One type of a remote convenience system is for remotely controlling vehicle functions. Other example types of remote convenience systems include garage door opener systems and entry light activation systems.

Examples of remotely controlled vehicle functions include locking and unlocking of one or more vehicle doors. A remote convenience vehicle system that permits remote locking and unlocking functions is commonly referred to as a remote keyless entry ("RKE") system. Remote convenience vehicle systems may provide for control of other vehicle functions.

Known remote convenience vehicle systems include a receiver/controller mounted in an associated vehicle and at least one portable hand-held transmitter located remote from the receiver/controller. Each transmitter is provided with one or more manually actuatable switches. Each switch is associated with a remote control vehicle function to be performed. The transmitter includes circuitry that responds to the actuation of each switch to transmit a message in the form of a digital signal.

The receiver/controller is configured to receive the transmitted signal and to determine the requested remote control function. Also, the receiver/controller is operatively connected to one or more vehicle systems that perform the function that are properly remotely requested.

To ensure that the remote function request is proper (i.e., authentic), known remote convenience vehicle systems use security codes or keys that accompany the function request message in the transmitted signal. In one known type of remote convenience vehicle system, a rolling code algorithm is performed to routinely modify the security key utilized within the system. Specifically, a rolling code algorithm is performed within the receiver/controller to determine a current security key, and a congruent rolling code algorithm is performed within the hand-held transmitter to also determine the same current security key.

Upon receipt of a transmitted signal containing a security key, the receiver/controller compares the key of the received signal with the key determined within the receiver/controller. If the received key is valid (i.e., the keys match), the receiver/controller causes performance of the requested function.

It is possible that the security key at the hand-held transmitter may become out of synchronization with the security key at the receiver/controller. One way that loss of synchronization can occur is if the hand-held transmitter changes the security key in response to actuation of a switch, but the receiver/controller does not receive the transmitted signal. Thus, the receiver/controller is "unaware" of the transmitted signal and is unaware of the security code change at the hand-held transmitter. It may even be possible to change the security key at the hand-held transmitter multiple times via multiple actuations of the switch while the security key at the receiver/controller remains unchanged.

SUMMARY OF THE INVENTION

In accordance with one aspect, the present invention provides a remote convenience system for remote control performance of a function. The system includes portable transceiver means for remote control requests. The system also includes controller/transceiver means for receiving the remote control requests and for controlling performance of the requested function. The portable transceiver means and the controller/transceiver means include security means for communicating security keys between the portable transceiver means and the control transceiver means. The security means includes means for preventing the controller/transceiver means from controlling performance of the requested function unless a proper security key is provided by the portable transceiver means to the controller/transceiver means. The security means includes means for changing a current security key only after a proper communication exchange between the portable transceiver means and the controller/transceiver means.

In accordance with another aspect, the present invention provides a remote convenience system for remote control performance of a function. The system includes portable transceiver means for a remote control request via a first transmitted signal containing a security key. The system also includes controller/transceiver means for receiving the remote control request via the first transmitted signal and for controlling performance of the requested function only if the security key contained in the first transmitted signal is valid. The controller/transceiver means includes means for providing a new security key to the portable transceiver means via a second transmitted signal to the portable transceiver means. The portable transceiver means includes means for acknowledging receipt of the new security key via a third transmitted signal to the controller transceiver means.

In accordance with another aspect, the present invention provides a remote convenience system for remote control performance of a function. The system includes portable transceiver means for remote control requests. The portable transceiver means includes means for transmitting a first signal containing a function request and a security key. The portable transceiver means includes means for receiving a transmitted second signal containing a new security key. The portable transceiver means also includes means for updating to the new security key. The system includes controller transceiver means for receiving the remote control request and for controlling performance of the requested function. The controller transceiver means includes means for receiving the first signal. The controller transceiver means also includes means for transmitting the second signal with the new security key to the portable transceiver means in response to receiving the first signal.

In accordance with another aspect, the present invention provides a remote convenience system for remote control performance of a function. The system includes portable transceiver means for remote control requests. The portable transceiver means includes means for providing a function request, means for holding a current security key, and means for transmitting a first signal containing the function request and the current security key. The portable transceiver means also includes means for receiving a second signal containing the current security key and the next security key, means for verifying the current security key, and means for replacing the current security key with the next security key in the means for holding. The system includes controller transceiver means for receiving the remote control requests and for controlling performance of the requested function. The controller transceiver means includes means for holding the current security key, means for receiving the first signal, means for verifying the current security key and means for providing the next security key. The controller transceiver means also includes means for transmitting the second signal to the portable transceiver means, and means for replacing the current security key with the next security key in the means for holding of the controller transceiver means.

In accordance with yet another aspect, the present invention provides a remote convenience system for remote control performance of a function. A portable transceiver transmits a first signal containing a remote control request and a security key, receives a transmitted second signal containing a new security key, and updates the new security key. A controller transceiver receives the first signal, controls performance of the requested function, and transmits the second signal with the new security key to the portable transceiver in response to receiving the first signal.

In accordance with still another aspect, the present invention provides a method of remote convenience function control. A first signal that contains a remote control function request and a security key is transmitted from a portable transceiver. The first signal is received at a controller transceiver. The requested function is performed in response to receipt of the first signal. A second signal with a new security key is transmitted from the controller transceiver in response to receipt of the first signal. The second signal containing the new security key is received at the portable transceiver. The security key is updated at the portable transceiver in response to receipt of the second signal.

BRIEF DESCRIPTION OF THE DRAWINGS

The foregoing and other features and advantages of the present invention will become apparent to those skilled in the art to which the present invention relates from a reading of the following detailed description of the preferred embodiment with reference to the accompanying drawings, in which:

FIG. 5 is a schematic circuit diagram of the portable transceiver of FIG. 1;

FIG. 6 is a schematic circuit diagram of the vehicle-based transceiver/controller of in FIG. 1;

DESCRIPTION OF THE PREFERRED EMBODIMENT

Figure 1:
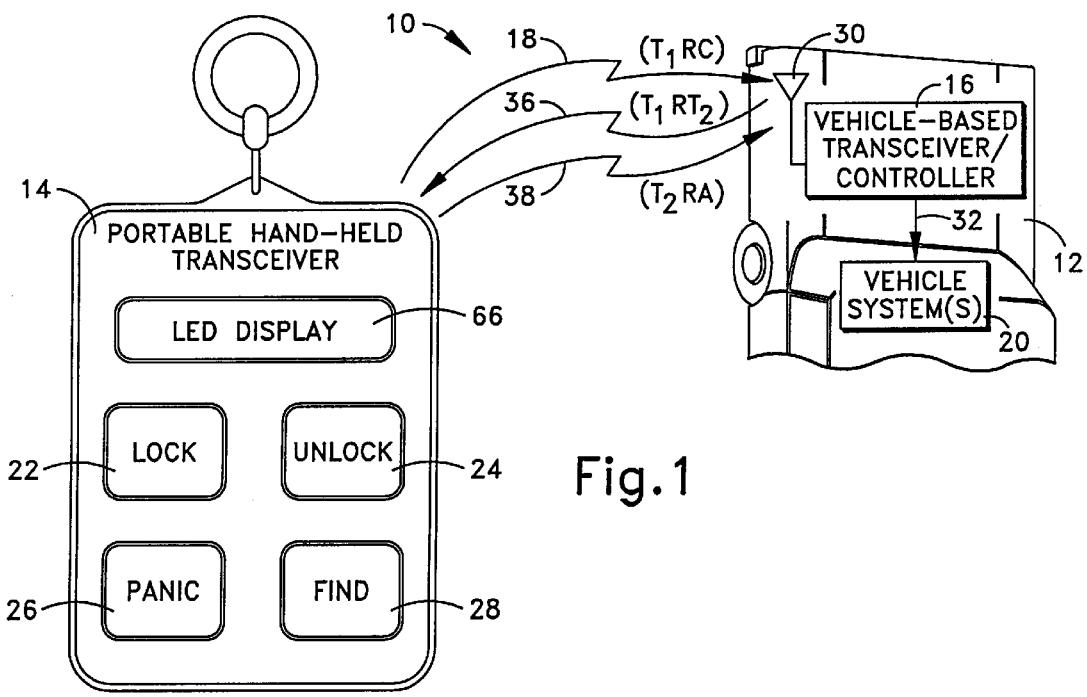
FIG. 1 is a schematic illustration of a remote convenience vehicle system, in accordance with the present invention, and shows a portable hand-held transceiver and a vehicle-based transceiver/controller.

A remote convenience vehicle system 10 in accordance with the present invention is schematically shown in FIG. 1, along with an associated vehicle 12. The system 10 includes a portable hand-held transceiver unit 14 (hereinafter referred as the "portable transceiver 14"), and a vehicle-based transceiver/controller 16 (hereinafter referred as the "vehicle-based transceiver 16"). It is to be appreciated that the system 10 may include additional portable transceivers that are similar to the illustrated portable transceiver 14.

The portable transceiver 14 is operable to communicate, via at least a function request signal 18, with the vehicle-based transceiver 16 to achieve remote control of at least one vehicle system 20. Preferably, the portable transceiver 14 is capable of transmitting several different function request signals 18 to the vehicle-based transceiver 16, to achieve remote control performance of different vehicle functions at one or more different systems 20. Hereinafter, only a single function request signal 18 is discussed, for simplicity.

The signal 18 (FIG. 2) is preferably a serially transmitted, digital signal that comprises a plurality of carrier-frequency pulses. Each pulse comprises an oscillating frequency that is "ON" for a controlled time period to represent a binary one or a binary zero. Preferably, the frequency of oscillation is in the radio frequency range. In one embodiment, the binary "one" and the binary "zero" are distinguished from each other by a difference in pulse length or duration during the "ON" portion of the signal.

Groupings of the binary "ones" and "zeros" form binary "words" that convey information. Specifically, one or more groups represent one or more command codes "C" that convey the remote function request. Herein, the group of one or more command codes "C" is referred to as "the function request command(s) message" of the signal 18.

The function request signal 18 is transmitted by the portable transceiver 14 (FIG. 1) in response to manual input from an operator (not shown). Specifically, the portable transceiver 14 includes at least one manually actuatable pushbutton selector switch. In the example shown in the Figures, there are four pushbutton selector switches 22–28 (hereinafter referred to as pushbuttons 22–28). A first pushbutton 22 and a second pushbutton 24 are associated with the vehicle door lock and unlock functions, respectively. A third pushbutton 26 is associated with a vehicle alarm or "panic" function. A fourth pushbutton 28 is associated with a remote vehicle locate or "find" function (i.e., short horn sound/ lights flash). It will be appreciated that the system 10 could be configured to control different remote convenience functions, and that the portable transceiver structure (i.e., the number, type, and location of the pushbuttons) would be accordingly different.

During operation, the operator (not shown) actuates one of the pushbuttons 22–28. In response to the actuation, the function request signal 18 is broadcast from the portable transceiver 14 and is intended to be "picked-up", at an antenna 30 of the vehicle-based transceiver 16. If the function request signal 18 is a proper signal, the vehicle-based transceiver 16 provides a signal 32 to the appropriate vehicle system 20 to cause performance of the requested remote convenience function.

With regard to the convenience functions that are remotely controlled at the vehicle 12 via the system 10, the person of ordinary skill in the art will understand the operation of such vehicle systems 20 and associated functions, as they are known in the art. Accordingly, a detailed description of the components and circuitry associated with such vehicle systems 20 is not provided herein for brevity. Also, it will be appreciated that the present invention is not limited to vehicles and is applicable to non-vehicle, remotely controlled systems (i.e., garage door opening or entry light activation).

To provide a measure of security such that only function request signals 18 from a particular portable transceiver 14 can cause performance of the vehicle functions of an associated vehicle, the system 10 utilizes at least one security code or key (e.g., an alphanumeric value) that accompanies the function request message within an overall communication packet conveyed via the function request signal 18. In the preferred embodiment, the system 10 utilizes a system key "R" (FIG. 2) that is unique to each system 10 (i.e., the portable transceiver 14 and the vehicle-based transceiver 16). The system key R is "secret" and, preferably, does not change.

Figure 2:
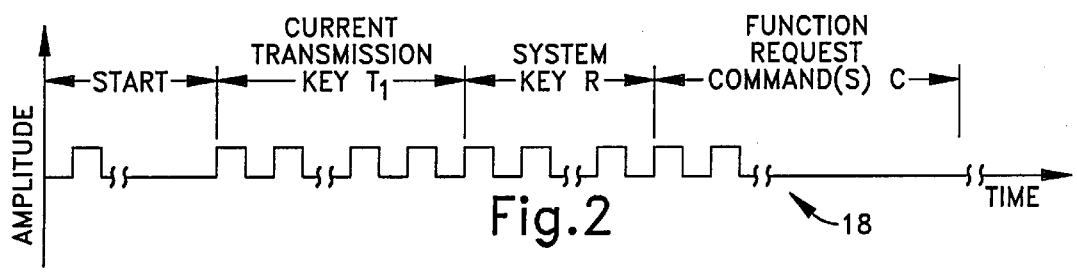
FIG. 2 is an example waveform of a function request signal from the portable transceiver.

Also, a current transmission security code or key "$T_1$" accompanies the function request message within the communication packet. The current transmission key $T_1$ is secret, and is routinely changed (i.e., "rekeyed"). In order for the vehicle-based transceiver 16 to cause performance of the requested vehicle function, the received function request signal 18 must convey the valid system key R and the valid current transmission key $T_1$. The example waveform illustrated in FIG. 2 shows the communication "packet" conveyed via the function request signal 18. It is to be noted that the message packet includes other portions (e.g., a start portion), in addition to the current transmission key $T_1$, the system key R, and the command(s) C. Also, it is to be noted that all or part of the communication packet can be encrypted. Encryption techniques are known in the art, and are not discussed herein for brevity.

To provide a further measure of security such that only function request signals 18 from the associated portable transceiver 14 can cause performance of the vehicle functions, the vehicle-based transceiver 16 broadcasts a response signal 36 that is intended for reception by its associated portable transceiver 14. The response signal 36 can be completely or partially encrypted.

Within the response signal 36 (FIG. 3), a next or update transmission key $T_2$ is provided from the vehicle-based transceiver 16 to the portable transceiver 14. The updated transmission key value is to be used by the portable transceiver 14 in the next transmitted function request signal 18. In other words, the vehicle-based transceiver 16 changes the value of the current transmission key $T_1$ that will be used in the system 10, and provides the new, updated value to the portable transceiver 14. The portable transceiver 14 does not generate or calculate (e.g., via performance of an algorithm) the next transmission key $T_2$. The portable transceiver 14 need only update the value of the current transmission key $T_1$ to the value of the next transmission key $T_2$. Thus, the routine change to the current transmission key $T_1$ within the system 10 is done "over-the-air" via transmitted signal.

Figure 3:
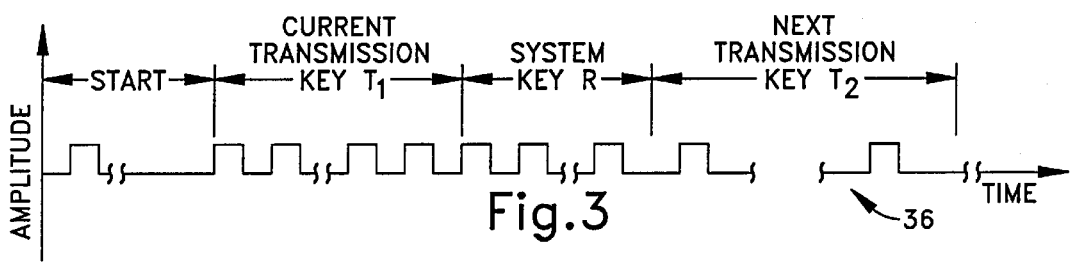
FIG. 3 is an example waveform of a response signal from the vehicle-based transceiver/controller.

As shown by the example waveform in FIG. 3, the response signal 36 conveys a start portion, the current transmission key $T_1$, the system key R, and the next transmission key $T_2$. It should be noted that the values of the system key R and the current transmission key $T_1$ in the response signal 36 are identical to the values of the system key R and the current transmission key $T_1$ in the function request signal 18 (FIG. 2). The system key R and the current transmission key $T_1$ are used by the portable transmitter 14 (FIG. 1) to verify that the response signal 36 is valid (i.e., the response signal is from its associated vehicle-based transceiver 16 of the system 10).

As yet a further security measure, the portable transceiver 14 transmits an acknowledgment signal 38 back to the vehicle-based transceiver 16 acknowledging the receipt of the response signal 36 and the update of the value of the current transmission key $T_1$ to the value of the next to be provided transmission key $T_2$.

Figure 4:
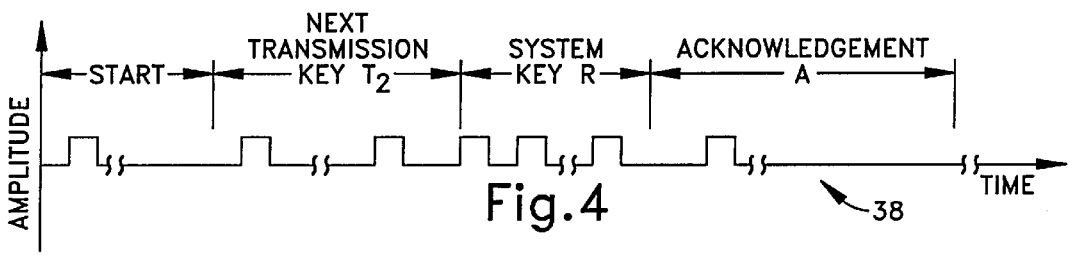
FIG. 4 is an example waveform of an acknowledgement signal from the portable transceiver.

An example waveform of the acknowledgment signal 38 is shown in FIG. 4. The acknowledgment signal 38 includes a start portion, the next transmission key $T_2$, the system key R, and an acknowledgment message "A". It should be noted that the value of the system key R and the next transmission key $T_2$ in the acknowledgement signal 38 are identical to the values of the system key R and the next transmission key $T_2$ in the response signal 36 (FIG. 3). The acknowledgement signal 38 (FIG. 1) informs the vehicle-based transceiver 16 that the change to the value of the current transmission key $T_1$ has occurred at the portable transceiver 14.

A schematic illustration of an example embodiment for performing the portable transceiver functions in accordance with the present invention is schematically shown in FIG. 5. The portable transceiver 14 includes a microprocessor 42 that is operatively connected to each of the pushbutton 22–28. Various microprocessor constructions are known in the art and are not discussed herein for brevity.

Each pushbutton 22–28 is capable of providing a respective signal 44–50 to the microprocessor 42 upon actuation. In response to a signal (e.g., 44) from one of the pushbuttons (e.g., 22), the microprocessor 42 accesses the appropriate function request command(s) C from a memory 52. The microprocessor 42 also accesses the system key R and the current transmission key $T_1$ from the memory 52. It is to be noted that various memory types and constructions are known in the art and are not discussed herein for brevity. The microprocessor 42 "assembles" the communication packet, which includes the current transmission key $T_1$, the system key R, and the command(s) C.

RF transceive circuitry 54 is operatively connected to the microprocessor 42 such that communication 56 between the microprocessor and the RF transceive circuitry can occur. The message packet is communicated to the RF transceive circuitry 54. The RF transceive circuitry 54 provides a communication signal 58 conveying the message packet to an antenna 60 of the portable transceiver 14. In turn, the antenna 60 emits the function request signal 18, which conveys the security keys R and $T_1$, and the function request command(s) C. It is to be noted that the RF transceive circuitry 54 and the antenna 60 are "tuned" to operate at the frequency for the system 10. It should be noted that several types of construction for the RF transceive circuitry 54 and the antenna 60 are known in the art and are not discussed herein for brevity.

Preferably, the portable transceiver 14 includes a timer 62 that is operatively connected to communicate 64 with the microprocessor 42. Upon provision of the function request message packet to the RF transceive circuitry 54 for subsequent broadcast of the function request signal 18, the microprocessor 42 instructs the timer 62 to begin timing out a predefined time period t. Upon expiration of the time period t, the timer 62 signals the microprocessor 42. The timed period t is referred to as a "response time period t". If the vehicle-based transceiver 16 is to properly respond to the function request signal 18, the vehicle-based transceiver 16 must provide the response signal 36, and the response signal must be received by the portable transceiver 14, within the response time period t.

The portable transceiver 14 also preferably includes a structure for providing indications of the operation of the portable transceiver to the operator (not shown). The portable transceiver 14 includes a light-emitting diode display ("LED") unit 66 operatively connected to the microprocessor 42. The LED unit 66 displays alphanumeric messages for the operator to read.

Upon performance of the various functions of the portable transceiver 14, the microprocessor 42 provides corresponding message signals 68 to the LED unit 66. For example, the LED unit 66 can indicate that a function request signal 18 is sent and the function that is being requested. Also, the LED unit 66 can indicate that the response signal 36 is received and the current transmission key $T_1$ is changed.

The antenna 60 is also capable of receiving broadcast signals. Specifically, the antenna 60 is capable of receiving the response signal 36 from the vehicle-based transceiver 16. In response to receipt of the response signal 36, the antenna 60 communicates 58 with the RF transceive circuitry 54 to provide an electrical signal conveying the contents of the response signal 36 to the RF transceive circuitry. In turn, the RF transceive circuitry 54 conveys the contents of the response signal 36 to the microprocessor 42.

The microprocessor 42 performs the functions of matching the current transmission key $T_1$ provided via the response signal 36 with the current transmission key $T_1$ stored/held within the memory 52. The microprocessor also performs the function of comparing the system key R, as provided via the response signal 36, to the system key R stored/held within the memory 52. If both the current transmission key $T_1$ and the system key R are valid, the microprocessor 42 updates the value of the current transmission key $T_1$ held in the memory 52 with the value of the next transmission key $T_2$, as provided via the response signal 36. The LED unit 66 displays an appropriate essage (e.g., "request function transmitted, security key updated").

The microprocessor 42 also assembles the components of the acknowledgment signal 38. The acknowledgment message A is accessed from the memory 52 by the microprocessor 42. The next transmission key $T_2$ (which is now also the current transmission key $T_1$ value stored/held in the memory 52, i.e., $T_1$ was set equal to $T_2$), the system key R, and the acknowledgment message A are communicated to the RF transceive circuitry 54. Similar to the processed performed for the function request signal 18, the RF transceive circuitry 54 provides a signal 58 to the antenna 60 and the acknowledgment message A is broadcast for reception by the vehicle-based transceiver 16.

A schematic illustration of an example embodiment for performing the vehicle-based transceiver functions in accordance with the present invention is shown in FIG. 6. The vehicle-based transceiver 16 includes RF transceive circuitry 74 operatively connected to the antenna 30. Upon receipt of the function request signal 18 by the antenna 30, the antenna communicates 76 with the RF transceive circuitry 74. The communication 76 conveys the received transmission key $T_1$, the system key R, and the requested command C.

A microprocessor 78 within the vehicle-based transceiver 16 is operatively connected to the RF transceive circuitry 74 for communication 80 between the microprocessor 78 and the RF transceive circuitry 74. The communication 80 conveys the received transmission key $T_1$, the system key R, and the requested command C to the microprocessor 78. In the microprocessor 78, the function request message is processed (e.g., decrypted, etc.). Specifically, the received transmission key $T_1$ provided via the transmitted function request signal 18 is compared to the value of the then current transmission key $T_1$ from a memory 82 of the vehicle-based transceiver 16. Similarly, the system key R provided via the transmitted function request signal 18 is compared to the system key R from the memory 82.

If the received transmission key $T_1$ and the system key R are valid (i.e., the keys match those from the memory 82), the microprocessor 78 determines the requested remote control function from the command(s) C, and provides the appropriate signal(s) 32 to the appropriate vehicle system(s) 20 (FIG. 1). If one or both of the system key R and the received transmission key $T_1$ provided via the function request signal 18 is/are not valid, the microprocessor 78 ignores the command(s) C.

After the microprocessor 78 provides the signal(s) 32 to the appropriate vehicle system 20 (assuming a T, and R match), the microprocessor proceeds to assemble the response message. Specifically, within the microprocessor 78, a next transmission key generation function 86 access/generates/creates the next transmission key $T_2$. The next key generation function 86 may use any suitable process to access/generate/create the next transmission key $T_2$. An example of such a suitable process is an algorithm for randomly accessing a value (e.g., an alphanumeric code word) stored in the memory 82. Another example is an algorithm for randomly generating an alphanumeric code word (e.g., a random number generator).

Again, assuming a key match, the microprocessor 78 assembles the received transmission key $T_1$, the system key R, and the next transmission key $T_2$ into the response message packet. The message packet is provided to the RF transceive circuitry 74 via the communication interconnection 80. In turn, the RF transceive circuitry 74 provides an electrical communication signal 76 to the antenna 30, and the antenna broadcasts the response signal 36.

Preferably, the vehicle-based transceiver 16 includes a timer 88 that is operatively connected to communicate 90 with the microprocessor 78. Upon providing the response message packet to the RF transceive circuitry 74 for subsequent broadcast of the response signal 36, the microprocessor 78 instructs the timer 88 to begin timing out a predefined time period t (although a common symbol "t" is used for the measured time periods in both the portable and vehicle-based transceivers, the time periods need not be related). Upon expiration of the time period t, the timer 88 signals the microprocessor 78. The timed period t is referred to as an "acknowledgement time period t". If the portable transceiver 14 is to properly acknowledge the response signal 36, the portable transceiver must provide the acknowledgement signal 38, and the acknowledgement signal must be received by the vehicle-based transceiver 16, within the acknowledgement time period t.

If the vehicle-based transceiver 16 receives the proper acknowledgment signal 38 within the acknowledgement time period t, the microprocessor 78 updates the value of the transmission key $T_1$ in the memory 82 to the value of the next transmission key $T_2$, i.e., the $T_1$ key is set equal to the $T_2$ key. If the vehicle-based transceiver 16 does not receive the proper acknowledgment signal 38 within the acknowledgement time period t, the microprocessor 78 does not update the current transmission key $T_1$ value in the memory 82.

It is to be appreciated that if the current transmission key $T_1$ is updated in the transceiver 14 but the acknowledgment signal 38 is not received by the transceiver 16 so that $T_1$ is not updated in 16, the portable transceiver 14 and the vehicle-based transceiver 16 have different values for the current transmission keys $T_1$. This condition is referred to as the transmission keys being "out of synchronization." It is to be understood that suitable structure is present in the portable and vehicle-based transceivers 14 and 16, and that suitable functions are preformed such that the current transmission keys at the portable and vehicle-based transceivers can be resynchronized. For example, upon a failure to cause a remotely requested function to be performed because of an out of synchronization situation, an exchange of broadcast signals between the portable and vehicle-based transceivers 14 and 16 can occur. The communication exchange permits the two associated units to verify the identity of each other and discriminate against similar but non-associated portable transceivers. The verification can be at a higher than normal level of scrutiny. As an addition function or as an alternative function, a temporary default security code can be used to initiate the verification process.

Figure 7:
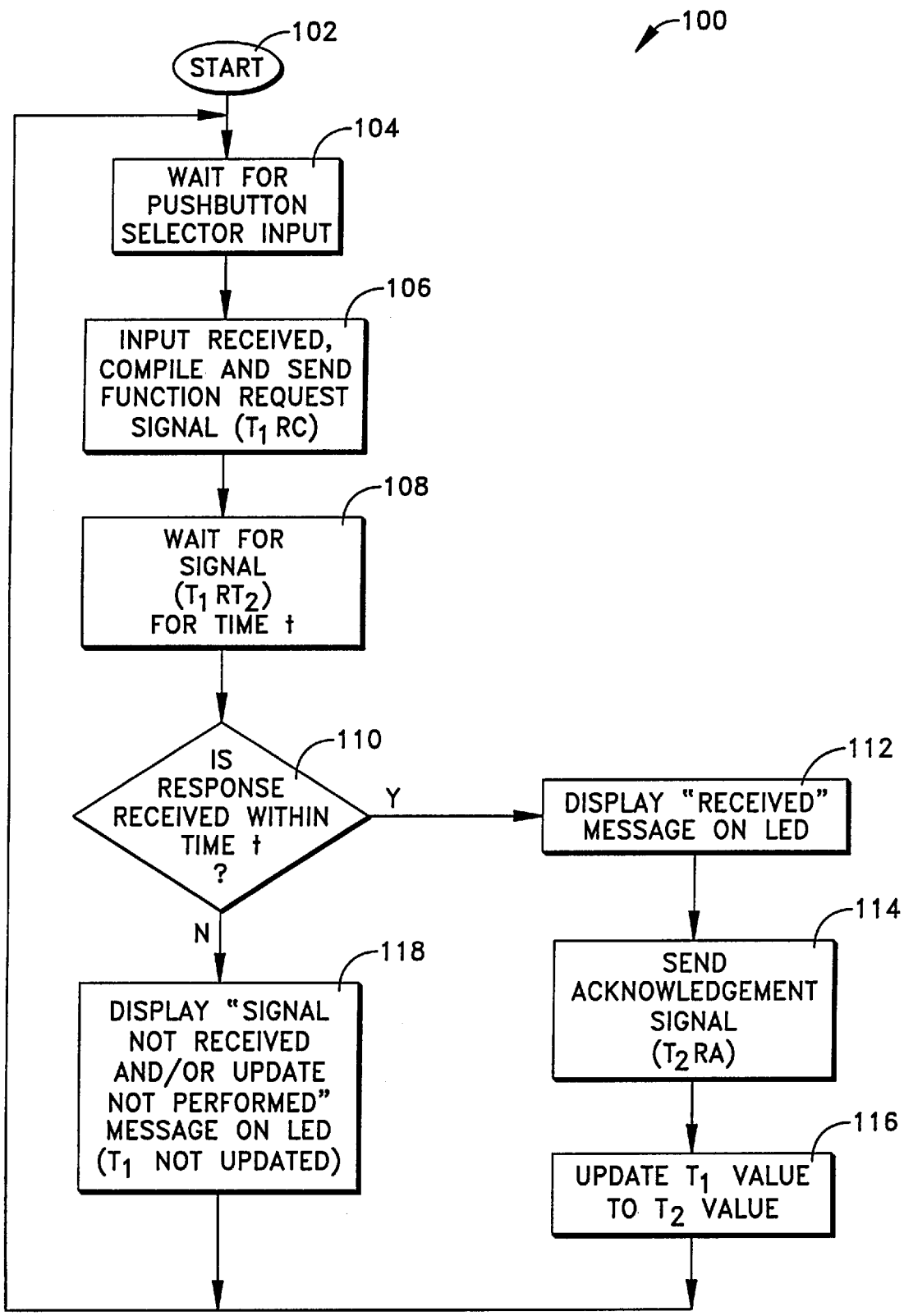
FIG. 7 is a flowchart for a process performed within the portable transceiver of FIG. 5.

An example of a process 100 performed within the portable transceiver 14 is illustrated in FIG. 7. The process 100 begins at step 102, wherein initial states are set (e.g., flags, etc. are reset). The process 100 goes to step 104 in which the microprocessor 42 awaits pushbutton selector input. When one of the pushbutton (e.g., 22) is actuated, the process 100 goes to step 106 in which the signal (e.g., 44) from the actuated pushbutton is provided to the microprocessor 42. The microprocessor 42 compiles the function request packet ($T_1$, R, and C), and causes the function request signal 18 to be broadcast from the antenna 60.

The process 100 goes to step 108 in which the portable transceiver 14 awaits the response signal 36 ($T_1$, R, and $T_2$) for the time period t. At step 110, it is determined whether a proper/authentic response signal 36 was received within the time period t. If the determination at step 110 is affirmative (i.e., a proper response signal 36 was received), the process 100 goes to step 112. At step 112, the microprocessor 42 provides the appropriate signal 68 to the LED unit 66 such that the LED unit displays a message (e.g., "vehicle has received function request signal") for review by the operator. The process 100 goes to step 114, in which the acknowledgment signal 38 ($T_2$, R, and A) is broadcast for reception by the vehicle-based transceiver 16. At step 116, the microprocessor 42 updates the value of the current transmission key $T_1$ to the value of the new transmission key $T_2$ that was provided via the response signal 36. Upon completion of step 116, the process 100 loops back to step 104 to await the next pushbutton selector input.

If the determination at step 110 is negative (i.e., the vehicle-based transceiver 16 does not respond with a valid response signal 36 within the time period t), the process 100 goes to step 118. At step 118, the microprocessor 42 provides an appropriate signal 68 to the LED unit 66. The LED unit 66 displays the message for review by the operator. The message on the LED may include statements to the effect that the vehicle may not have received the function request signal, the portable transceiver has not received the response signal, and/or the update of the security keys was not performed.

It is to be noted that the value of the current transmission key $T_1$ is not updated in the memory 52. Upon completion of step 118, a process 100 loops to step 104. Also, it is to be noted that an authentication/resynchronization subroutine can be included in the process 100. The authentication/resynchronization subroutine is performed before a subsequent pushbutton selector actuation will result in the requested remote convenience function being performed at the vehicle 12.

Figure 8:
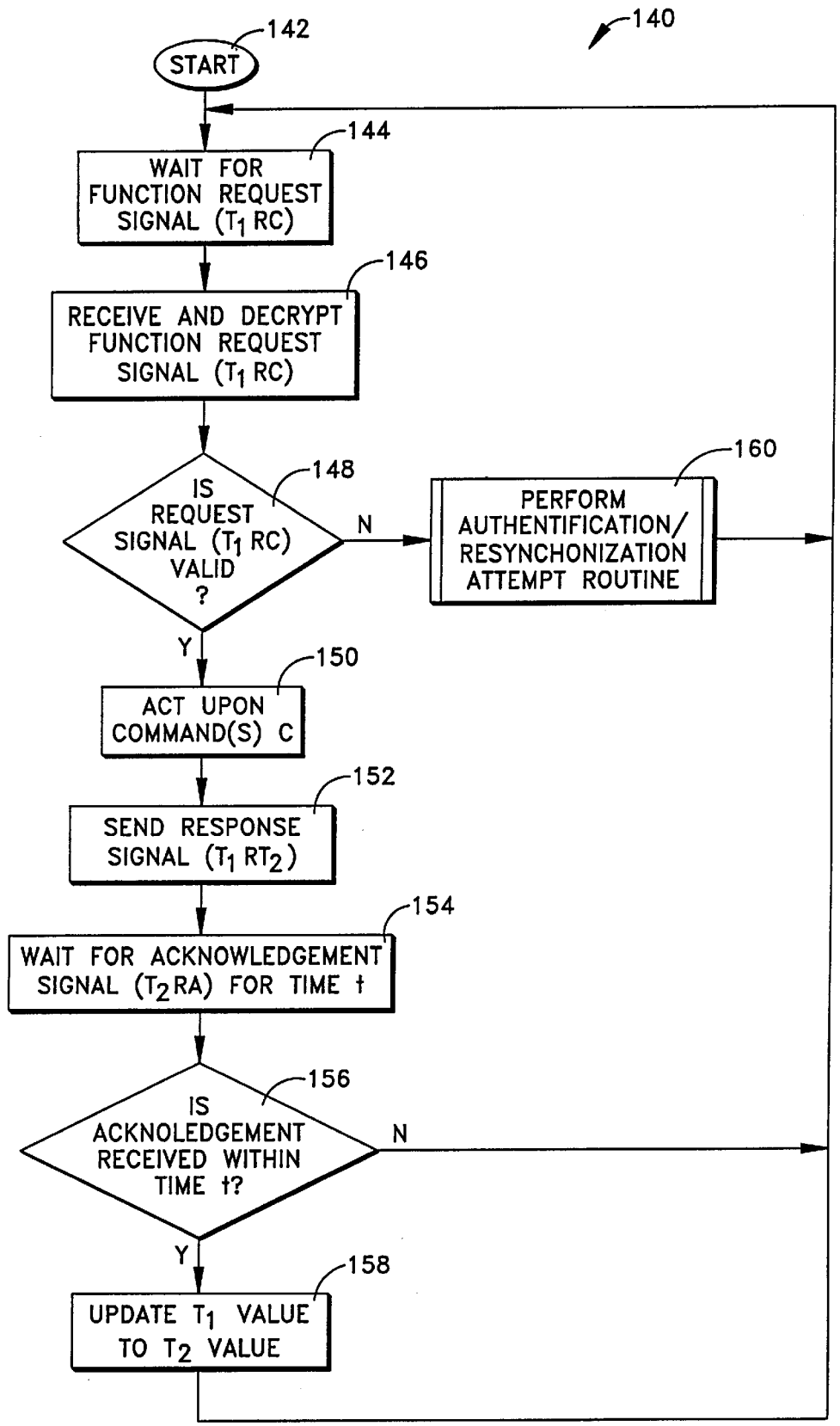
FIG. 8 is a flowchart for a process performed within the vehicle-based transceiver/controller of in FIG. 6.

An example of a process 140 performed within the vehicle-based transceiver 16 is shown in FIG. 8. The process 140 begins at step 142 in which initial values are set (e.g., flags reset, etc.). The process 140 goes from step 142 to step 144, in which the vehicle-based transceiver 16 awaits the function request signal 18 from the portable transceiver 14. When the function request signal 18 is received, the process 140 goes to step 146. The message conveyed via the function request signal 18 is processed (e.g., decrypted, etc.).

At step 148, it is determined whether the function request signal 18 is valid (e.g., the system key R and the current transmission key $T_1$ are checked against the values in the memory 82). If the determination at step 148 is affirmative (i.e., the system key R, the valid current transmission key $T_1$, and the command(s) are valid), the process 140 goes to step 150. At step 150, the microprocessor 78 provides the appropriate signal 32 to the vehicle system 20 to perform the requested remote convenience function.

The process 140 goes from step 150 to step 152, in which the microprocessor 78 assembles the response message ($T_1$, R, and $T_2$), and causes the response signal 36 to be broadcast from the antenna 30. At step 154, the vehicle-based transceiver 16 awaits the acknowledgment signal 38 ($T_2$, R, and A) from the portable transceiver 14 for the time period t.

At step 156, it is determined whether a valid acknowledgment signal 38 was received within the time period t. If the determination at step 156 is affirmative (i.e., the portable transceiver 14 sent a valid acknowledgment signal which was received by the vehicle-based transceiver 16), the process 140 goes to step 158. At step 158, the microprocessor 78 updates the value of the current transmission key $T_1$ in the memory 82 to the value of the new transmission key $T_2$. Upon completion of step 158, the process 140 loops to step 144 to await reception of a subsequent function request signal 18.

If the determination at step 148 is negative (i.e., a function request signal 18 received by the vehicle-based transceiver is not valid), the process 140 goes to step 160. The message of a function request signal 18 may be invalid for several reasons. The function request signal 18 may be from a portable transceiver that is not part of the system 10. Thus, the system key R and the current transmission $T_1$, and possibly the command(s)C may all be invalid/incompatible.

However, the function request signal 18 message may be invalid because the transmitted current transmission key $T_1$ is outdated (i.e., an update was not completed properly). At step 160, an authentication/resynchronization attempt routine is performed. Within the routine, the vehicle-based transceiver 16 will attempt to authenticate that the message received from the portable transceiver 14 is from a portable transceiver that is associated with the vehicle-based transceiver. Also, within the routine of step 160, the current transmission keys will be resynchronized if the signal is authenticated. Upon completion of step 160, the process 140 loops to step 144 (i.e., wait for a next command signal). It should be noted that the operator of the portable transceiver 14 may need to re-actuate the desired selector and cause a retransmission of the function request signal 18 (and the portable transceiver may have to perform a resynchronization routine).

If the determination at step 156 is negative (i.e., an acknowledgment signal is not received by the vehicle-based transceiver within the time period T), the process loops from step 156 to step 144 instead of proceeding to step 158. Thus, the value of the current transmission key $T_1$ is not updated within the memory 82 of the vehicle-based transceiver 16. If the value of the current transmission key is updated in the portable transceiver 14 and not updated in the vehicle-based transceiver 16, the values of the current transmission keys contained within the portable transceiver and the vehicle-based transceiver do not correspond (i.e., out of synchronization). The next function request signal 18 will result in a negative determination at step 148 (i.e., the command message is not valid). In turn, the authentication/resychronization routine is performed at step 160.

Thus, one advantage of the present invention is that the current transmission key contained within the portable transceiver 14 is never changed merely by actuating one of the pushbuttons 22–28, without a following communication interaction between the portable transceiver 14 and the vehicle-based transceiver 16. The only way that the current transmission key contained within the portable transceiver 14 is changed is via a proper communication sequence (e.g., negotiation) between the portable transceiver and the vehicle-based transceiver 16. This helps maintain the synchronization of the security key at the portable and vehicle-based transceivers 14, 16. In other words, accidental or mischievious pushbutton actuation is rendered harmless by the present invention.

From the above description of the invention, those skilled in the art will perceive improvements, changes and modifications. For example, the functions performed via a microprocessor could be accomplished by discrete circuitry designed to perform the functions. The invention was described in terms of digital word signals which were transmitted between transceivers 14, 16. The present invention contemplates that coded analog signals could be used. Analog signals could use frequency coding, modulation coding, etc. Also, verification of security keys could be done by a process other than direct comparison (e.g., predefined responses). The invention is not limited to use of electromagnetic transmissions. The invention could be encoded using other forms of remote communication such as infrared, ultrasonic, etc. Such improvements, changes and modifications within the skill of the art are intended to be covered by the appended claims.

Having described the invention, the following is claimed:

1. A remote convenience system for remote control performance of a function, said system comprising:

portable transceiver means for remote control requests, said portable transceiver means including means for providing a function request, means for holding a current security key, means for transmitting a first signal containing the function request and the current security key, and means for receiving a second signal containing the current security key and the next security key, means for verifying the current security key, and means for replacing the current security key with the next security key in said means for holding; and controller transceiver means for receiving said remote control requests and for controlling performance of the requested function, said controller transceiver means including means for holding the current security key, means for receiving the first signal, means for verifying the current security key, means for providing the next security key, means for transmitting the second signal to the portable transceiver means, and means for replacing the current security key with the next security key in said means for holding of said controller transceiver means.

2. A remote convenience system for remote control performance of a function, said system comprising:

portable transceiver transmitting a first signal containing a remote control request and a security key, receiving a transmitted second signal containing a new security key, and updating to the new security key; and controller transceiver receiving the first signal, controlling performance of the requested function, and transmitting the second signal with the new security key to the portable transceiver in response to receiving the first signal.

3. A method of remote convenience function control, said method comprising:

transmitting a first signal containing a remote control function request and a security key from a portable transceiver;

receiving the first signal at a controller transceiver;

performing the requested function in response to receipt of the first signal;

transmitting a second signal with a new security key from the controller transceiver in response to receipt of the first signal;

receiving the second signal containing the new security key at the portable transceiver; and updating to the new security key at the portable transceiver in response to receipt of the second signal.

4. A remote convenience system for remote control performance of a function, said system comprising:

portable transceiver means for remote control requests; and controller transceiver means for receiving said remote control requests and for controlling performance of the requested function;

said portable transceiver means and said controller transceiver means including security means for communicating security keys between said portable transceiver means and said control transceiver means, and for preventing said controller transceiver means from controlling performance of the requested function unless a proper current security key is provided by said portable transceiver means to said controller transceiver means, and said security means including means for changing the current security key for a subsequently requested controlled performance of a function in response to a proper communication exchange between said portable transceiver means and said controller transceiver means.

5. A remote convenience system for remote control performance of a function, said system comprising:

portable transceiver means for a remote control request via a first transmitted signal containing a current security key; and controller transceiver means for receiving said remote control request via said first transmitted signal and for controlling performance of the requested function only if the current security key contained in said first transmitted signal is valid;

said portable transceiver means including means for holding the current security key and for providing the current security key contained in said first transmitted signal, said controller transceiver means including means for holding the current security key and for comparing the held current security key with the current security key contained in said first transmitted signal to determine if the current security key contained in said first transmitted signal is valid, said controller transceiver means including means, responsive to the current security key contained in said first transmitted signal being determined to be valid, for providing a new security key to said portable transceiver means via a second transmitted signal to said portable transceiver means, and said portable transceiver means including means for acknowledging receipt of the new security key via a third transmitted signal to said controller transceiver means and for updating the current held security key to the new security key within said means for holding of said portable transmission.

6. A remote convenience system for remote control performance of a function, said system comprising:

portable transceiver means for remote control requests, said portable transceiver means including means for transmitting a first signal containing a function request and a security key, and means for receiving a transmitted second signal containing a new security key, and means for updating to the new security key for a next subsequent transmission of a function request; and controller transceiver means for receiving said remote control requests and for controlling performance of the requested function, said controller transceiver means including means for receiving the first signal, and means for transmitting the second signal with the new security key to the portable transceiver means in response to receiving the first signal.

7. A remote convenience system as set forth in claim 6, wherein the security key contained within the first signal is a current security key, said means of said controller transceiver means for transmitting the second signal includes means for transmitting the second signal with the current security key and the new security key, said means of said portable transceiver means for receiving the second signal includes means for receiving the second signal with the current security key and the new security key, said portable transceiver means includes means for holding a value of the current security key contained within said first signal and means for comparing the held value of the current security key with a value of the current security key contained within the second signal, and said means of said portable transceiver means for updating to the new security key includes means for updating only if the value of the current security key contained within the second signal is the same as the held value of the current security key.

8. A remote convenience system as set forth in claim 7, wherein said controller transceiver means includes means for holding a value of a security key and means for comparing the held value with the value of the current security key contained within the first signal, and said means of said controller transceiver means for transmitting the second signal includes means for transmitting only if the value of the current security key contained within the first signal is the same as the held value.

9. A remote convenience system as set forth in claim 7, wherein said portable transceiver means includes means for timing a period in which the second signal can be received to cause updating to the new security key value.

10. A remote convenience system as set forth in claim 7, wherein said means of said portable transceiver means for transmitting the first signal includes means for transmitting the first signal containing a system security key in addition to the current security key, said means of said controller transceiver means for transmitting the second signal includes means for transmitting the second signal containing a system security key in addition to the current security key and the next security key, and said means of said portable transceiver means for updating to the new security key includes means for updating only if the second signal contains the system security key.

11. A remote convenience system as set forth in claim 10, wherein said means of said controller transceiver means for transmitting the second signal includes means for transmitting the second signal only if the first signal contains the system security key.

12. A remote convenience system as set forth in claim 6, wherein said portable transceiver means includes means for transmitting a third signal containing an acknowledgement of the receipt of the second signal, said controller transceiver means includes means for receiving said third signal.

13. A remote convenience system as set forth in claim 12, wherein said controller transceiver means includes means for holding a value of the current security key that is updated to a value of the new security key upon receipt of the third signal.

14. A remote convenience system as set forth in claim 13, wherein said controller transceiver means includes means for timing a period in which the third signal can be received to cause updating to the new security key value.

15. A remote convenience system as set forth in claim 6, wherein said remote convenience system is a remote control vehicle convenience system, said portable transceiver means is a hand-held unit, said controller transceiver means is a vehicle based unit, and said controller transceiver means provides a signal to a vehicle system to cause performance of the requested function.

16. A remote convenience system for remote control performance of a function, said system comprising:

portable transceiver means for remote control requests; and controller transceiver means for receiving said remote control requests and for controlling performance of the requested function;

each of said portable transceiver means and said controller transceiver means including memory means for retaining, while said system awaits occurrence of a remote control request, a security key used to verify authenticity of the currently occurring remote control request, said controller transceiver means including means for causing said memory means of said portable transceiver means to return, while said system awaits occurrence of a subsequent remote control request, a new, different security key to be used to verify authenticity of the subsequent remote control request.

* * * * *